United States Patent [19]

Damron

[11] Patent Number: 4,679,839

[45] Date of Patent: Jul. 14, 1987

[54] GRAPPLE SNUBBER

[76] Inventor: Tony R. Damron, 8301 Bell Fountain Dr., Ocean Springs, Miss. 39564-9049

[21] Appl. No.: 860,554

[22] Filed: May 7, 1986

[51] Int. Cl.[4] ............................ B66C 1/00; F16F 9/00

[52] U.S. Cl. .................................. 294/119.4; 188/381

[58] Field of Search ...................... 294/86.4, 88, 119.4; 37/183 R; 188/72.4, 366, 367, 381; 403/15, 31, 113, 120; 414/626, 732-735, 738-740

[56] References Cited

U.S. PATENT DOCUMENTS

| | | | |
|---|---|---|---|
| 2,742,107 | 4/1956 | DuBois | 188/366 X |
| 3,185,256 | 5/1965 | Schilling | 188/366 X |
| 3,301,587 | 1/1967 | Heikkinen | 294/119.4 X |
| 3,425,518 | 2/1969 | Morrow | 188/366 X |
| 3,592,503 | 7/1971 | Lundberg | 294/119.4 |
| 4,335,914 | 6/1982 | Korbel | 294/119.4 |
| 4,553,778 | 11/1985 | Tyer | 294/119.4 |
| 4,572,567 | 2/1986 | Johnson | 294/119.4 |
| 4,573,728 | 3/1986 | Johnson | 294/119.4 |

*Primary Examiner*—Johnny D. Cherry

*Attorney, Agent, or Firm*—Trexler, Bushnell, Giangiorgi & Blackstone, Ltd.

[57] ABSTRACT

A log skidder has a lifting arm which may be raised or lowered by hydraulic pressure. A grapple is carried at the end of the lifting arm for lifting one end of a log to drag it from one area to another. The suspension for the grapple from the arm includes a body pivotally connected to the arm by a first horizontal pivot rod, and the grapple is pivotally connected to the body by a second horizontal pivot rod perpendicular to the first pivot rod. A pair of snubbers respectively encircle the pivot rod. Each snubber includes a ring-shaped hydraulic cylinder having a ring-shaped piston therein. Hydraulic fluid introduced into the cylinder extends the respective pistons to effect snubbing between the body and the arm in between the grapple and the body.

4 Claims, 5 Drawing Figures

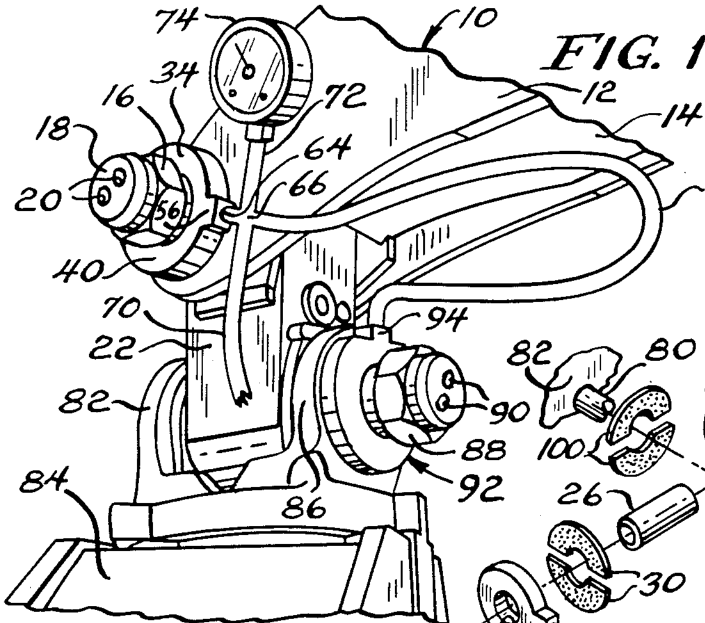
FIG. 1
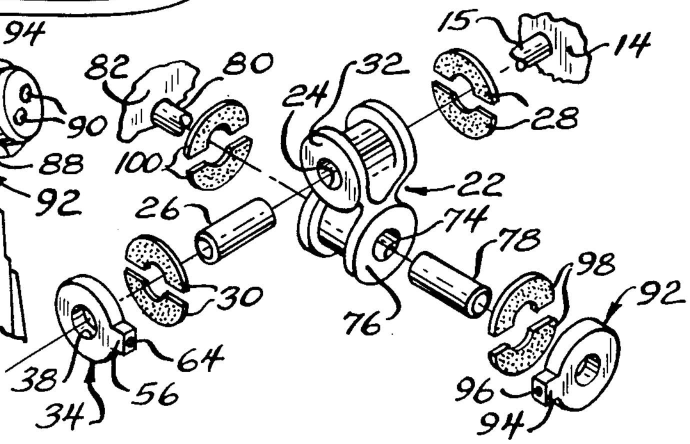
FIG. 4
FIG. 2
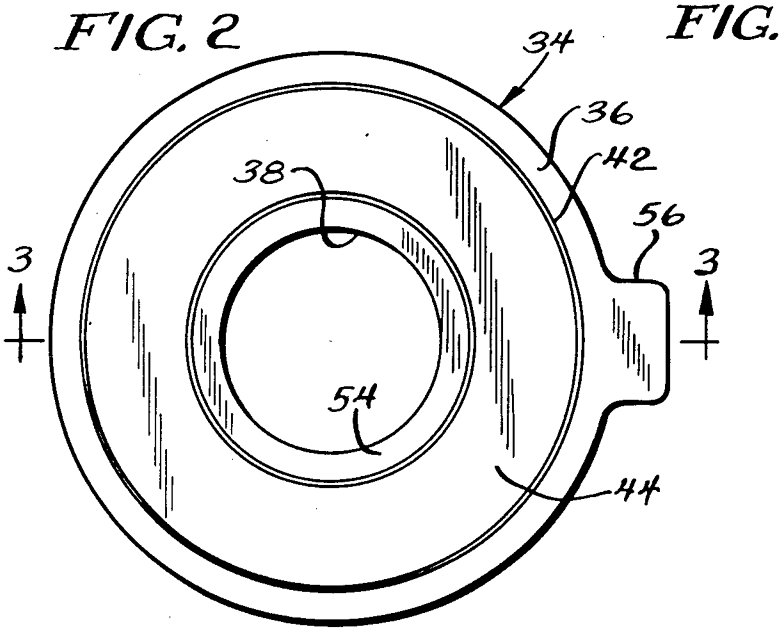
FIG. 3
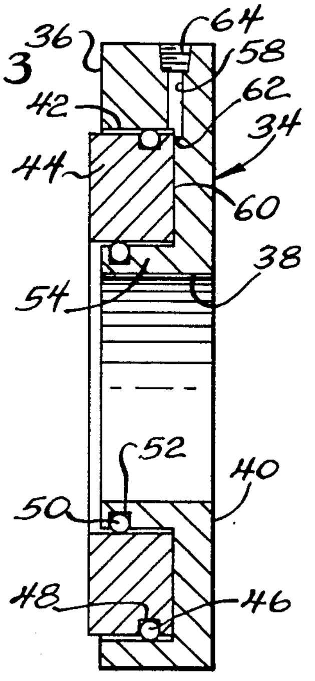
FIG. 5
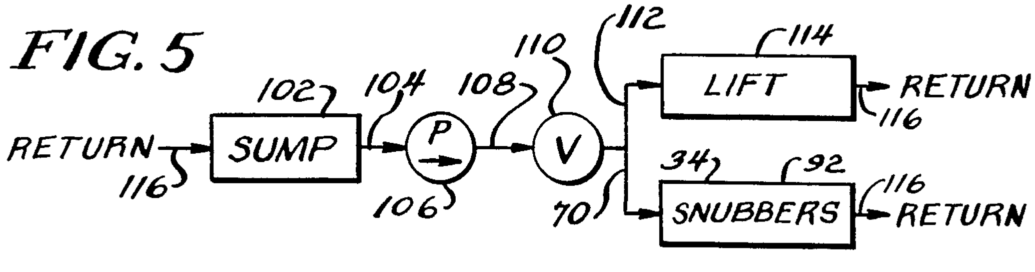

GRAPPLE SNUBBER

BACKGROUND OF THE INVENTION

In the commercial harvesting of trees from a forest it is common practice to cut down trees, and to remove the branches and upper portions thereof to leave rather large logs. Each such log must be removed from the cutting area in the forest to a loading area for shipment by truck, train or boat. The cutting area is likely to be heavily wooded and may also have a great deal of underbrush. It is common practice to grip one end of a log with a grapple mechanism carried on a truck, often known as a log skidder, and to pull a log from the cutting area to a loading area with one end dragging on the ground. .

A problem previously encountered is that the grapple is suspended from a swivel mechanism and tends to swing freely when it is not loaded. This is dangerous to anyone nearby and sometimes causes damage to the tractor itself. Even when the grapple is loaded it, and the front end of the log carried thereby, may start swinging back and forth with resultant danger, and with undue stress placed on the grapple and the remainder of the log skidder.

Efforts previously have been made to prevent free swinging of the grapple. In U.S. Pat. No. 3,592,503 a viscous liquid damper is used to inhibit swinging. This, however, does not stop swinging, but only slows it. Efforts also have been made to snub grapples by tightening bolts manually in the mounting swivels. This is slow and sometimes dangerous.

OBJECTS AND SUMMARY OF THE PRESENT INVENTION

It is an object of the present invention to provide a self-adjusting grapple snubber which is operated hydraulically from a remote location. In particular, it is an object of the present invention to provide a grapple snubber which locks the grapple against swinging motion whenever the grapple is raised.

In accordance with the present invention, a hydraulic braking mechanism is provided for snubbing movement about each axis of the supporting swivel of a grapple in a log skidder. Each hydraulic brake mechanism includes a ring-shaped piston concentric with the respective swivel pivot shaft and mounted in a ring-shaped recess or cylinder in a base member. Introduction of hydraulic fluid under pressure into the cylinder causes the piston and base member to move axially away from one another, thereby compressing otherwise relatively movable parts together through a friction brake material. Fluid pressure is applied automatically whenever the grapple is lifted, or it may be applied under a separate manual control.

THE DRAWINGS

The present invention will best be understood with reference to the following text when taken in combination with the accompanying drawings wherein:

FIG. 1 is a perspective view of a portion of a grapple and a supporting arm as in a log skidder;

FIG. 2 is an axial view of the hydraulic brake mechanism;

FIG. 3 is a cross-sectional view taken substantially along the line 3—3 in FIG. 2;

FIG. 4 is a fragmentary view in exploded perspective showing certain of the parts of the brake mechanism; and FIG. 5 is a hydraulic circuit diagram showing operation of the self-adjusting grapple snubber which is the subject of the present invention.

DETAILED DESCRIPTION OF THE ILLUSTRATED EMBODIMENT

Turning now greater particularity to the drawings, and first to FIG. 1 there will be seen the rear end of a hydraulically actuated boom 10 at the rear of the tractor or log skidder, and generally lying along the center line thereof. The boom is pivoted at its opposite end to a rear portion of the tractor, and suitable hydraulic cylinders are provided for lifting the boom, all as is well known in the art. The boom includes a pair of spaced, parallel side plates 12 and 14 extending parallel to the longitudinal axis of the tractor A cross bolt 15 (FIG. 4) is inserted in a hole in the side plate 14 and welded in place. The opposite end of the cross bolt extends through an aligned aperture in the side plate 12 and has a large hexagonal nut 16 threaded thereon. The nut is in the nature of a cap-nut having an integral cap 18. Two threaded bores 20 parallel to the axis of the nut are provided which extend completely through the cap 18. Set screws (not shown) are threaded in the bores 20 and bear against the end of the bolt 15 to lock the nut 16 in adjusted position on the bolt.

A block 22 is pivotally supported between the side plates 12 and 14, having a crossbore 24 through which the bolt 15 extends. A bearing sleeve 26 preferably is mounted in the crossbore 24 and engages the surface of the cross bolt. A pair of flat, arcuately shaped brake members 28 is adhesively or otherwise secured to the side plate 14 and engage the confronting surface of the block 22 about the crossbore 24. Similarly, a pair of brake members 30 is adhesively or otherwise secured to the inner face of the side plate 12 and confront the adjacent arcuate surface 32 of the block 22 about the crossbore 24. Although the brake members are illustratively secured to the side plates and frictionally engage the adjacent, confronting faces of the block 22, it will be understood that the mounting could be reversed, or that the arcuate brake members 28 and 30 could each be continuous and supported by the bolt, frictionally engaging both the side plates and the block.

A brake actuator 34 is disposed against the external surface of the side plate 12 and directly beneath the nut 16. The brake actuator, as best seen in FIGS. 3 and 4, comprises an annular body 36 having a central bore 38 accommodating the crossbolt 15. End face 40 of the body 36 is flat and is engaged by the nut 16. The opposite face is provided with a face-opening annular recess 42 which effectively comprises a brake cylinder. An annular piston 44 is received in the annular recess or cylinder 42 and is sealed to the body 36 by means of an outer O-ring 46 received in an outwardly opening annular recess 48 in the annular piston 44 and by an inner O-ring 50 received in an outwardly opening recess 52 in the hub 54 of the body 36 surrounding the bore 38 therethrough.

A radial extension 56 on the body 36 is provided with a radial bore 58 which overlaps the inner face 60 of the recess or brake cylinder 42 axially of the brake actuator, and which extends inwardly a short distance beyond the outer periphery of the recess 42 as indicated at 62. The outer end of the bore 58 is internally threaded at 64 for receipt of a fitting on the end of a flexible hydraulic brake line 64 (FIG. 1). The brake line is connected at an X cross connection 66 to a branch line 68 which will be discussed shortly hereinafter. It is also connected to an actuator line 70 to be discussed later, and to a gauge line 72, leading to an oil pressure gauge 74.

From the foregoing, it will be seen that the block 22 can swing fore and aft of the tractor about the crossbolt 15 except when it is snubbed by the brake mechanism.

A similar structure is provided at the bottom of the block 22, the block having a longitudinal bore 74 lying substantially along the longitudinal plane of the tractor. A front flat surface 76 surrounds the bore, and there is a similar rear surface (not shown).

A bearing sleeve 78 is received in the bore 74 and a crossbolt 80 is welded to one upstanding ear 82 at the top of the grapple 84. A second ear 86 extends upwardly from the top of the grapple and is parallel to the ear 82. The bolt 80 extends through the bore in the ear 86 and has a hexagonal nut 88 threaded on the opposite thereof. This hexagonal nut is again in the nature of a capnut and has a pair of threaded bores 90 extending parallel to the axis of the nut and in which set screws are threaded to engage the end of the bolt 80 to lock the nut in adjusted position.

A brake actuator 92 similar to the brake actuator 34 is positioned immediately beneath the nut 88 and has a radial extension 94 with a tapped bore 96 to which the brake line 68 is connected by a conventional hydraulic fitting.

A pair of arcuate brake members or friction pads 98 are adhesively or otherwise secured to the inner face of the ear 86 and frictionally bear against the flat surface 76 of the block 22. Similarly, brake members or friction pads 100 are adhesively or otherwise secured to the inner face of the ear 82 and frictionally engage the rear flat face (not shown) surrounding the bore 74 of the block 22. All of the brake members are identical, and may be of conventional asbestos compound, or metallic compound. As noted previously, they may be in a form of complete circles supported by the respective bolts 15 and 80, and not secured to any of the confronting surfaces, but simply frictionally engaging the respective confronting surfaces.

An exemplary hydraulic circuit for the snubber is shown in FIG. 5 and includes a hydraulic sump 102 having an output line 104 to a pump 106. A line 108 leads from the pump 106 to a valve 110. The output from the valve 110 leads through one line 112 to the hydraulic lift mechanism or cylinders 114 for the boom 10. A branch line comprises the line 70 previously disclosed and leads to the snubbers 34 and 92. Return lines 116 lead from the lift mechanism 114 and snubbers 34 and 92 to the sump 102.

Whenever the boom is lifted by operation of the valve 110 to apply hydraulic pressure to the lift mechanisms, the snubbers are also actuated, thereby snubbing or substantially locking the boom against swiveling movement. The snubbers thus are automatically operated whenever the swivel is raised, either for travelling empty, or for dragging a log. Operation can also be manual independently of the lift, using the same circuit, but simply omitting the branch line 112 and lift mechanism 114 from the circuit as shown.

It is important to note that the ring-shaped piston and cylinder arrangement is disposed exteriorly of the snubber suspension members. Therefore, any possible leakage of hydraulic or other operating fluid is isolated from the snubber operating parts including the friction discs. It is also important to note that a grease fitting can be substituted for one or both of the hydraulic connectors, whereby either or both of the snubbers can be actuated by pressurized grease.

When this is done there is always a snubbing force which is sufficient to resist movement of the unloaded grapple parts, but which allows movement of loaded parts. Under the foregoing circumstances it will be appreciated that the grease acts as equivalent to hydraulic fluid. Additional grease needs to be added only every month or every two months.

The specific example of the invention as now herein shown and described will be understood as being for purposes of illustration only. Various changes in the structure will no doubt occur to those skilled in the art, and will be understood as forming a part of the present invention in so far as they fall within the spirit and scope of the appended claims.

The invention is claimed as follows:

1. The combination in a log skidder comprising a lifting arm, a grapple and means suspending said grapple from said arm comprising a body, a first pivot member suspending said body from said arm and pivotable about a first substantially horizontal axis, a second pivot member substantially perpendicular to said first pivot member suspending said grapple from said body and pivotable about a second substantially horizontal axis substantially perpendicular to said first substantially horizontal axis, first hydraulic snubber means acting between said arm and said body to inhibit movement between said arm and said body, second hydraulic snubber means acting between said body and said grapple to inhibit movement between said grapple and said body, and hydraulic means for operating said first hydraulic snubber means and said second hydraulic snubber means to inhibit such movement, each said hydraulic snubber means comprising a block having a central bore receiving the respective pivot member, said block having a face-opening recess concentric with and spaced radially outwardly from said bore and defining a ring-shaped cylinder, and a ring-shaped piston in said cylinder.

2. The combination as set forth in claim 1 and further including a hydraulic lift mechanism for said arm, and means operating said hydraulic means upon lifting of said arm to operate both of said snubber means to inhibit movement.

3. The combination as set forth in claim 2 and further including a hydraulic pressure source effective simultaneously to operate said hydraulic lift mechanism to lift said arm and to operate said hydraulic means to operate both of said snubber means.

4. The combination as set forth in claim 1 wherein said recess has an inner face, and further including means providing a radial hydraulic bore overlapping and at least in part extending radially along said face.

* * * * *